United States Patent
Ryon et al.

(10) Patent No.: US 11,686,252 B2
(45) Date of Patent: Jun. 27, 2023

(54) FUEL INJECTORS WITH TORCH IGNITORS

(71) Applicant: Collins Engine Nozzles, Inc., Des Moines, IA (US)

(72) Inventors: Jason A. Ryon, Carlisle, IA (US); Lev A. Prociw, Johnston, IA (US); Brandon Phillip Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/897,650

(22) Filed: Aug. 29, 2022

(65) Prior Publication Data

US 2023/0112356 A1 Apr. 13, 2023

Related U.S. Application Data

(63) Continuation of application No. 17/499,484, filed on Oct. 12, 2021.

(51) Int. Cl.
| | |
|---|---|
| *F02C 7/264* | (2006.01) |
| *F23Q 7/06* | (2006.01) |
| *F23R 3/28* | (2006.01) |
| *F23Q 7/26* | (2006.01) |

(52) U.S. Cl.
CPC ............... *F02C 7/264* (2013.01); *F23Q 7/06* (2013.01); *F23Q 7/26* (2013.01); *F23R 3/286* (2013.01); *F05D 2220/32* (2013.01); *F05D 2260/85* (2013.01); *F05D 2260/99* (2013.01)

(58) Field of Classification Search
CPC ........ F02C 7/26; F02C 7/264; F05D 2260/85; F05D 2260/99; F23Q 7/06; F23Q 7/26; F23Q 9/00; F23R 3/286
See application file for complete search history.

(56) References Cited

U.S. PATENT DOCUMENTS

| | | | |
|---|---|---|---|
| 4,112,675 A | | 9/1978 | Pillsbury et al. |
| 4,412,414 A | * | 11/1983 | Novick ............... F23R 3/12 60/39.23 |
| 4,860,533 A | | 8/1989 | Joshi |
| 5,368,474 A | * | 11/1994 | Welden ............... F24H 1/107 431/278 |
| 6,912,857 B2 | | 7/2005 | Schmotolocha et al. |
| 7,571,598 B2 | | 8/2009 | O'Brien et al. |
| 9,822,692 B2 | | 11/2017 | Konczol et al. |
| 10,378,456 B2 | | 8/2019 | Stuttaford et al. |
| 10,584,639 B2 | | 3/2020 | Dam et al. |
| 10,711,699 B2 | | 7/2020 | Dam et al. |

(Continued)

OTHER PUBLICATIONS

Extended European Search Report dated Mar. 3, 2023, issued during the prosecution of European Patent Application No. 22200555.5.

*Primary Examiner* — Scott J Walthour
(74) *Attorney, Agent, or Firm* — Locke Lord LLP; Joshua L. Jones; Scott D. Wofsy (57) ABSTRACT

A fuel injector includes a fuel nozzle configured to issue a spray of fuel from a fuel outlet in a downstream direction along an injection axis. The fuel nozzle defines a main flow passage therethrough. An injection fuel line is in fluid communication with the fuel nozzle to supply fuel to the fuel nozzle. A torch ignitor has a flame outlet opening into the main flow passage of the fuel nozzle for issuing flame into the main flow passage.

13 Claims, 6 Drawing Sheets

(56) References Cited

U.S. PATENT DOCUMENTS

| | | |
|---|---|---|
| 10,815,893 B2 | 10/2020 | Kleckler et al. |
| 2004/0168442 A1 | 9/2004 | Schmotolocha et al. |
| 2005/0053876 A1 | 3/2005 | Joos et al. |
| 2005/0166595 A1 | 8/2005 | Fletcher et al. |
| 2010/0293953 A1 | 11/2010 | Wilbraham |
| 2010/0308135 A1* | 12/2010 | Yamamoto .............. F23R 3/343 239/402 |
| 2011/0041508 A1 | 2/2011 | Karlsson et al. |
| 2011/0287373 A1 | 11/2011 | Stanton |
| 2012/0047903 A1 | 3/2012 | Williams et al. |
| 2012/0186264 A1 | 7/2012 | Hoke |
| 2014/0366505 A1* | 12/2014 | Prociw .................... F02C 7/266 60/39.821 |
| 2019/0010872 A1 | 1/2019 | Dam et al. |
| 2019/0195498 A1 | 6/2019 | Prociw et al. |
| 2021/0215100 A1 | 7/2021 | Head et al. |

* cited by examiner

FUEL INJECTORS WITH TORCH IGNITORS

CROSS-REFERENCE TO RELATED APPLICATIONS

This is a continuation of U.S. patent application Ser. No. 17/499,484 filed Oct. 12, 2021 the content of which is incorporated by reference herein in its entirety.

BACKGROUND

1. Field

The present disclosure relates to fuel injection and ignition, and more particularly to fuel injection and ignition in gas turbine engines.

2. Description of Related Art

A small, independent torch igniter system offers many advantages for gas turbine engines. It offers an independent heat source from the main combustor which is used to ignite, stabilize, and relight the main combustor. The isolated nature of this system allows it to be stable regardless of the conditions within the main combustor. A torch ignitor can provide rapid relight capabilities.

The conventional techniques have been considered satisfactory for their intended purpose. However, there is an ever present need for improved systems and methods for improved torch ignitor systems and methods. This disclosure provides a solution for this need.

SUMMARY

A fuel injector includes a fuel nozzle configured to issue a spray of fuel from a fuel outlet in a downstream direction along an injection axis. The fuel nozzle defines a main flow passage therethrough. An injection fuel line is in fluid communication with the fuel nozzle to supply fuel to the fuel nozzle. A torch ignitor has a flame outlet opening into the main flow passage of the fuel nozzle for issuing flame into the main flow passage.

The flame outlet can meet the main flow passage at a position that is upstream of the fuel outlet with respect to the downstream direction along the injection axis. The main flow passage can define a main outlet for flame from the torch ignitor, wherein the fuel outlet is an annular opening.

The torch ignitor can include a torch wall defining a combustion chamber therein. The combustion chamber can be connected to outlet flame through the flame outlet passing out of the torch wall and into the main flow passage of the fuel nozzle. A torch fuel injector can be mounted to the torch wall to issue fuel into the combustion chamber. At least one ignitor can be mounted to the torch wall, positioned to ignite fuel issued from the fuel injector. The combustion chamber can be connected to the flame outlet by flame tube. The flame tube and flame outlet can be oriented tangential relative to the injection axis to swirl flame from the combustion chamber around the main flow passage of the fuel nozzle.

The fuel nozzle can include an inner air swirler of the main flow passage. The inner air swirler can define a plurality of passages configured to impart swirl on a flow of air flowing therethrough. The plurality of passages of the inner air swirler can be upstream of the flame outlet with respect to the downstream direction along the injection axis. The fuel nozzle can include an inner heat shield outboard of the inner air swirler, with an insulation gap defined between the inner heat shield and the inner air swirler. An intermediate air swirler can be defined between the inner air swirler and the inner heat shield.

The fuel nozzle can include a fuel distributor outboard of the inner heat shield. The fuel nozzle can include a prefilmer outboard of the fuel distributor. The prefilmer can include a prefilming surface, wherein the fuel outlet is defined between the fuel distributor and the fuel prefilming surface. The fuel nozzle can include an outer heat shield outboard of the prefilmer with an insulation gap defined between the prefilmer and the outer heat shield. The outer heat shield can define an outer air passage outboard of the outer heat shield. The injection fuel line can pass through the outer heat shield and prefilmer into a fuel circuit defined between the fuel distributor and the prefilmer. The torch ignitor can pass through the inner heat shield and inner air swirler.

A system includes an engine case. A combustor is included within the engine case. A plurality of fuel injectors connect from outside the engine case to the combustor to issue fuel and air into the combustor for combustion. Each of the fuel injectors in the plurality of fuel injectors is as described above, with the fuel nozzle connected to the combustor to issue a spray of fuel from a fuel outlet in a downstream direction along an injection axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
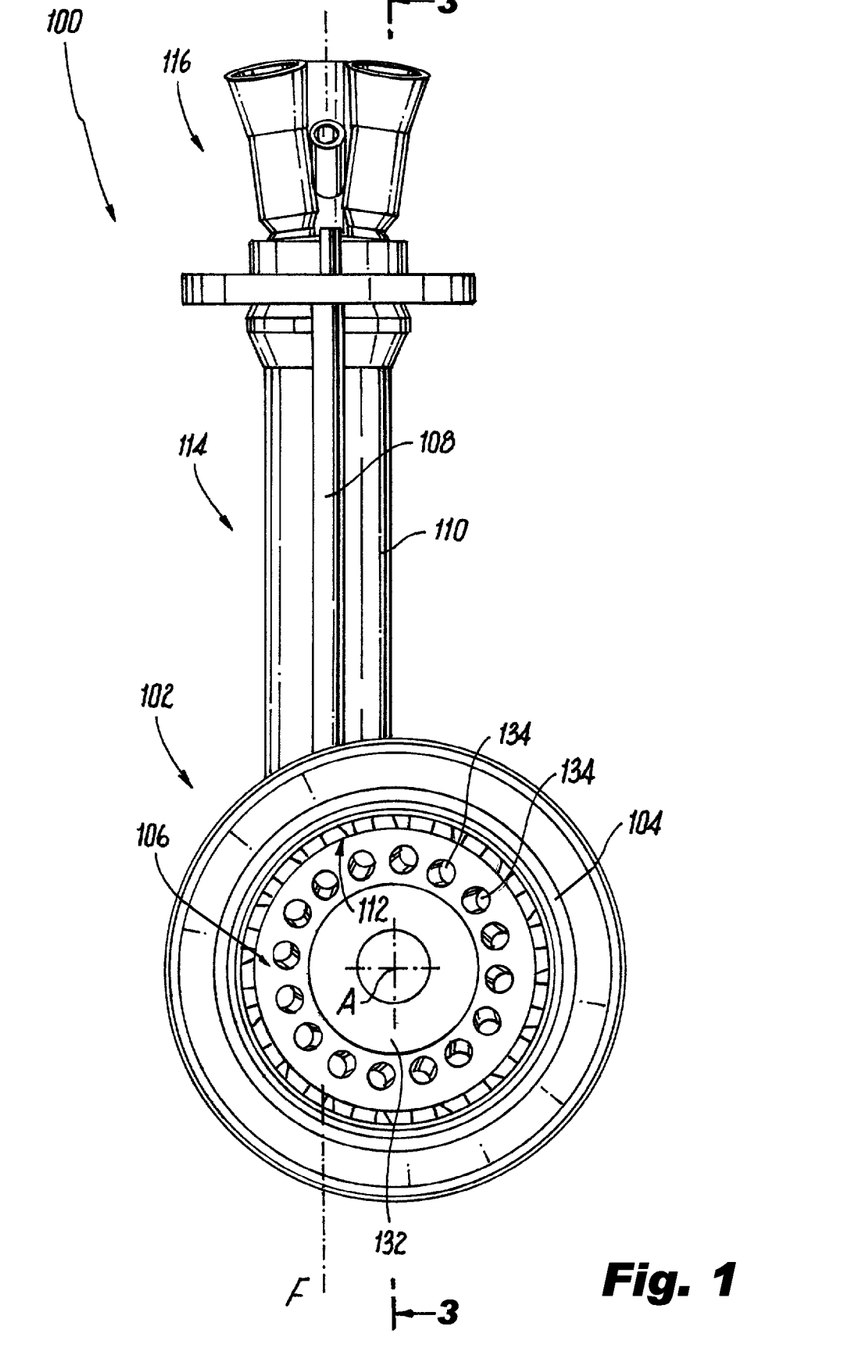
FIGS. 1 and 2 are schematic downstream and upstream elevation views of an embodiment of an injector constructed in accordance with the present disclosure, showing the fuel nozzle and torch ignitor.

Reference will now be made to the drawings wherein like reference numerals identify similar structural features or aspects of the subject disclosure. For purposes of explanation and illustration, and not limitation, a partial view of an embodiment of a fuel injector in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to provide fuel injectors with torch ignitors.

Figure 2:
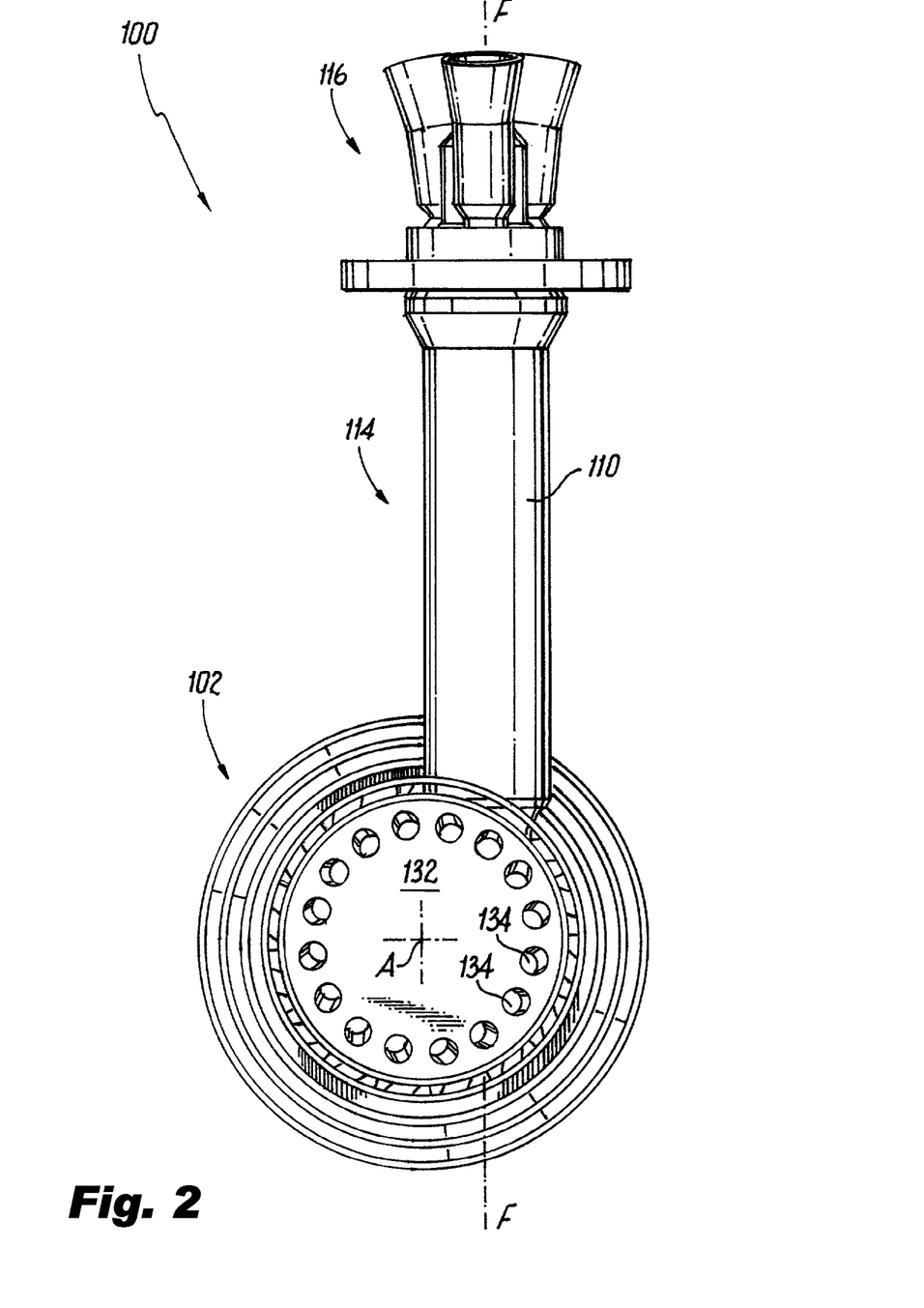
Figure 3:
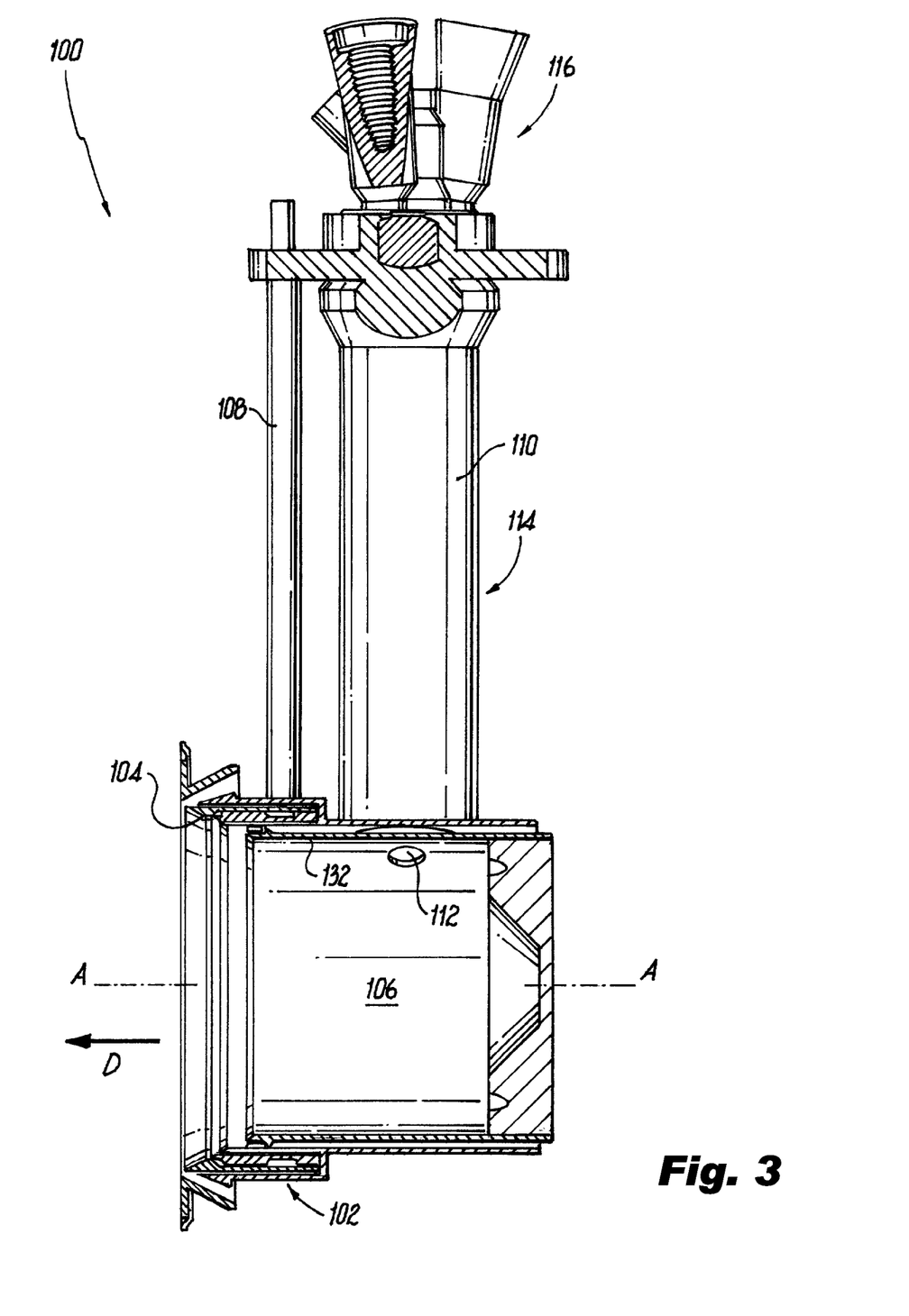
FIGS. 3-4 are schematic cross-sectional side elevation views of the injector and a portion of the injector, respectively, of FIGS. 1-2, showing the internals of the fuel nozzle.
Figure 4:
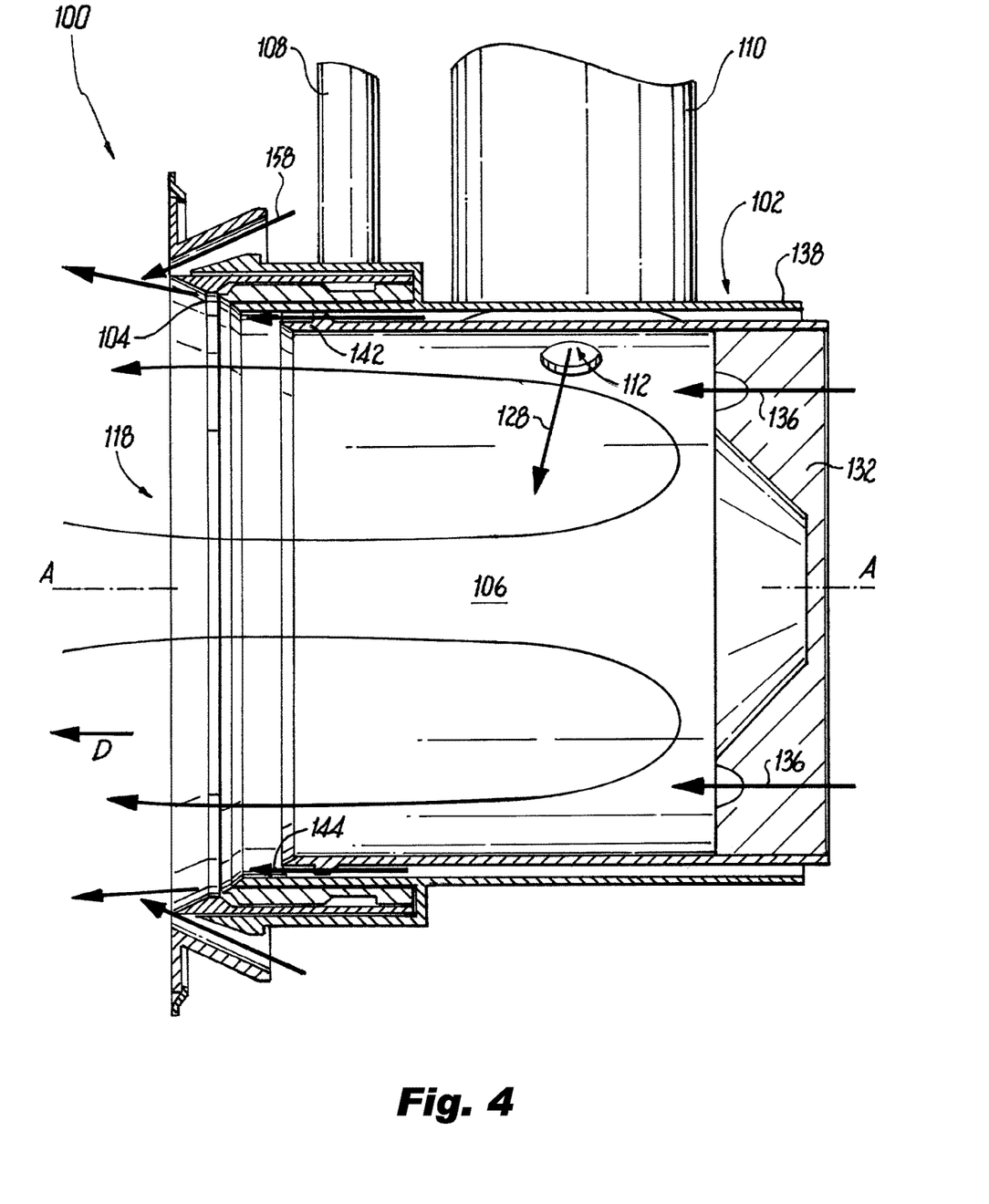

The fuel injector 100 includes a fuel nozzle 102 configured to issue a spray of fuel from a fuel outlet 104 in a downstream direction D along an injection axis A (the injection axis A and the downstream direction D along the injection axis A are labeled in FIGS. 3-4). The fuel nozzle 102 defines a main flow passage 106 therethrough. An injection fuel line 108 is in fluid communication with the fuel nozzle 102 to supply fuel to the fuel nozzle 102. A torch ignitor 110 has a flame outlet 112 opening into the main flow passage 106 of the fuel nozzle 102 for issuing flame into the main flow passage 106. As shown in FIGS. 1, 2, and 3, the injection fuel line 108 and torch ignitor 110 define a feed arm 114 extending between a fitting 116 and the fuel nozzle 102, wherein the feed arm 114 is generally perpendicular to the injection axis A of the fuel nozzle 102.

With reference now to FIG. 3, the flame outlet 112 meets the main flow passage 106 at a position that is upstream of the fuel outlet 104 with respect to the downstream direction D along the injection axis A, i.e. the flame outlet 112 is to the right of the fuel outlet 104 as oriented in FIG. 3. As shown in FIG. 4, the main flow passage 106 defines a main outlet 118 for flame from the torch ignitor 110. The fuel outlet 104 is an annular opening.

Figure 5:
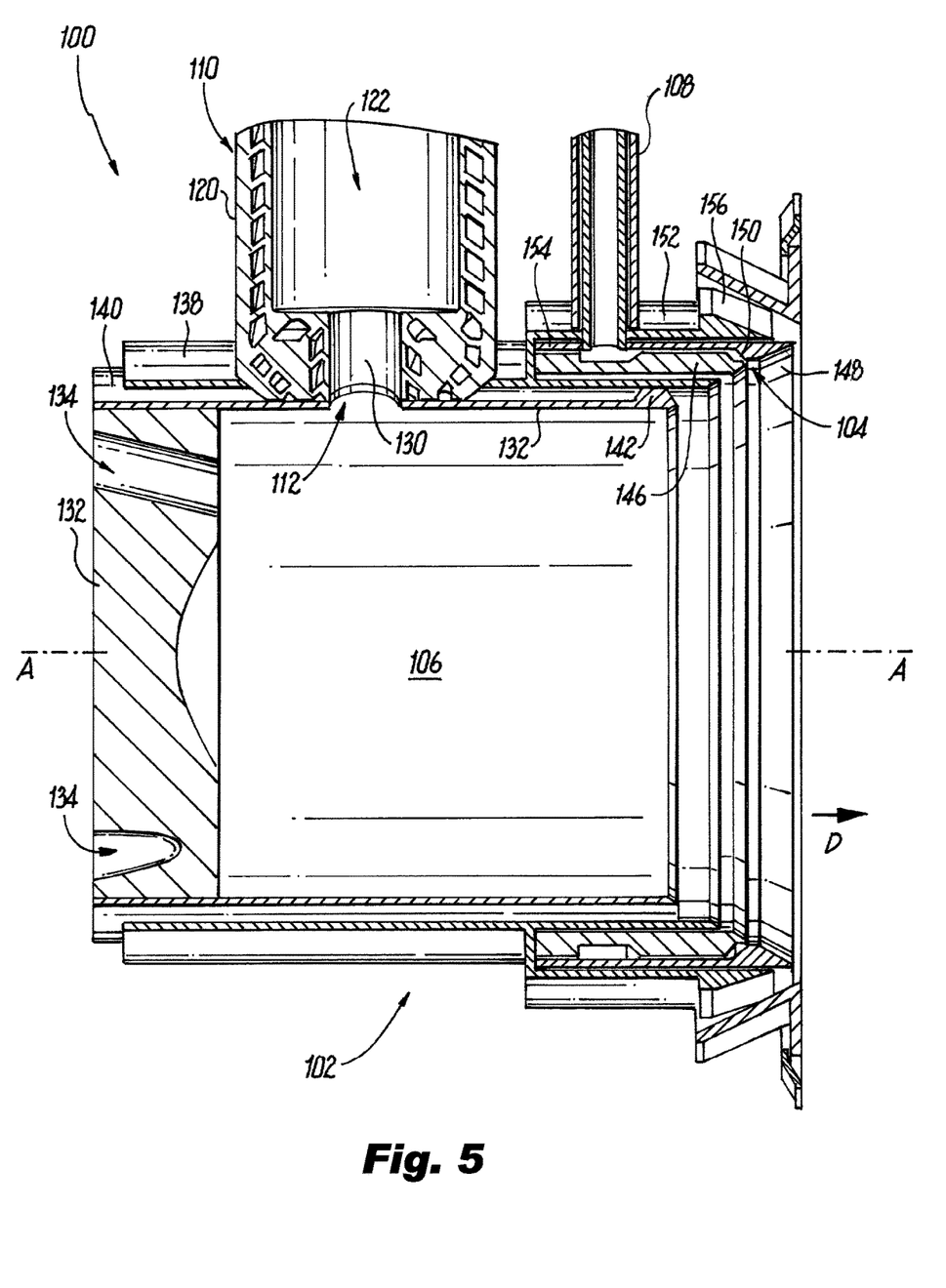
FIG. 5 is a schematic cross-sectional side elevation view of the fuel nozzle of FIG. 4, showing the internals of the fuel nozzle from an opposite side from that shown in FIG. 4.

With reference now to FIG. 5, the torch ignitor 110 includes a torch wall 120 defining a combustion chamber 122 therein. A torch fuel injector 124 (identified in FIG. 6) is seated in the fitting 116, which connects to the torch wall 120 to spray fuel into the combustion chamber 122. Ignitors 126 (identified in FIG. 6) also extend through the fitting 116 into the combustion chamber 122 to provide an ignition source for a fuel air mixture in the combustion chamber 122.

With continued reference to FIG. 5, the combustion chamber 122 is connected to outlet flame (indicated by arrow 128 in FIG. 4) through the flame outlet 112 passing out of the combustion chamber 122 of the torch wall 120 and into the main flow passage 106 of the fuel nozzle 102. The combustion chamber 122 is connected to the flame outlet 112 by flame tube 130. The flame tube 130 and flame outlet 112 are oriented tangential relative to the injection axis A to swirl flame from the combustion chamber 122 around the main flow passage 106 of the fuel nozzle 102, as indicated by the offset between the flame axis F and the injection axis A in FIGS. 1 and 2.

With continued reference to FIG. 5, the fuel nozzle 102 includes an inner air swirler 132 in the main flow passage 106. The inner air swirler 132 defines a plurality of passages 134 upstream of the main flow passage 106 within the inner air swirler 132 configured to impart swirl on a flow of air flowing therethrough, as indicated by arrows 136 in FIG. 4. The plurality of passages 136 of the inner air swirler are upstream of the flame outlet 112 with respect to the downstream direction D along the injection axis A. The fuel nozzle 102 includes an inner heat shield 138 outboard of the inner air swirler 132, with an insulation gap 140 defined between the inner heat shield 138 and the inner air swirler 132. An intermediate air swirler 142 is defined between the inner air swirler 132 and the inner heat shield 138 to impart swirl on air (indicated by arrow 144 in FIG. 4) passing out of the insulation gap 140.

With ongoing reference to FIG. 5, the fuel nozzle 102 includes a fuel distributor 146 outboard of the inner heat shield 138, and a prefilmer 148 outboard of the fuel distributor 146. The prefilmer 148 includes a prefilming surface 150, wherein the fuel outlet 104 is defined between the fuel distributor 146 and the fuel prefilming surface 150. The fuel nozzle 102 includes an outer heat shield 152 outboard of the prefilmer 148 with an insulation gap 154 defined between the prefilmer 148 and the outer heat shield 152. The outer heat shield 152 defines an outer air passage 156 outboard of the outer heat shield 152, which can be a swirling or non-swirling passage that converges the air flow therethrough as indicated in FIG. 4 by arrow 158. The injection fuel line 108 passes through the outer heat shield 152 and prefilmer 148 into a fuel circuit defined between the fuel distributor 146 and the prefilmer 148. The torch ignitor 110 (including the flame opening 112) passes through the inner heat shield 138 and inner air swirler 132.

Figure 6:
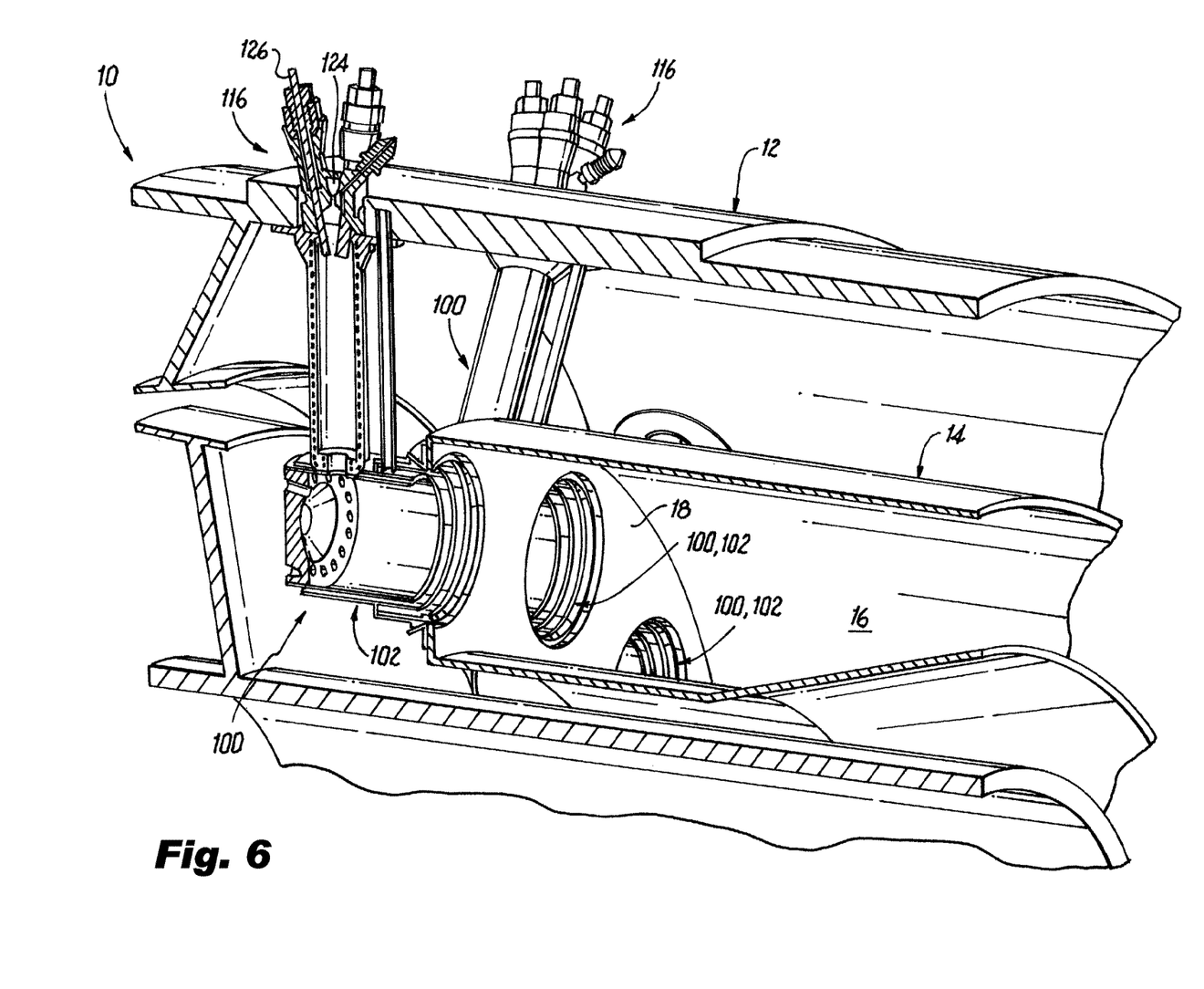
FIG. 6 is a cross-sectional perspective view of a system incorporating fuel injectors as shown in FIGS. 1-5.

With reference now to FIG. 6, a system 10 includes an engine case 12 of a gas turbine engine. A combustor 14 is included within the engine case 12. A plurality of fuel injectors 100 as described above connect for fluid communication from the fixtures 116 outside the engine case 12 to the combustor 14 to issue fuel and air into the combustor 14 for combustion in the main combustion volume 16. Each of the fuel injectors 100 in the plurality of fuel injectors has its respective fuel nozzle 102 operatively connected to or associated with an upstream combustor dome wall 18 of the combustor 14 to issue a spray of fuel from a fuel outlets 104, labeled in FIG. 5, in a downstream direction D along an injection axis A (as labeled in FIGS. 4-5).

In a gas turbine engine, replacement of one or more traditional fuel injectors with a continuous ignition device as disclosed herein allows complete control of each individual injection. This permits a large degree of fuel staging while still maintaining stability since each system is independently controlled and isolated from disruptions of neighboring systems.

Potential benefits include the following. Systems and methods as disclosed herein can allow extensive turndown (one torch device can remain stable while all others are turned off, for example. They can allow extensive redundancy, e.g. even if one or more torch devices fail through some failure modes, others can be adjusted to compensate until replacement can occur. Light-around problems can be reduced or eliminated. Systems and methods as disclosed herein can greatly improve altitude relight as multiple systems can be simultaneously ignited. There can be a reduction in the probability of altitude flameout. Individual injector/torch control can be used to break acoustic issues. Further devices can be employed in the main combustor to allow for adequate temperature uniformity and combustion efficiency such as air swirlers surrounding the torches, dilution jets, and combustion liner cooling features. Torches can be aimed to maximize performance. For example, the elbow between the torch ignitor 110 and the fuel nozzle 102 can be given a partially tangential direction to improve main combustor mixing, as indicated in FIGS. 1-2, and can even have a tilt to the left or right as oriented as in FIG. 3 to suit given applications. Torches can be oriented for convenient locations and also to improve/maximize performance. Health monitoring can be setup for each fuel injector to provide feedback to monitor and improve overall health. For example, thermocouples can be used as sensors for detecting flames and temperatures of each torch device. This can be coupled with individual control valves to increase/decrease the fuel flow to an individual device if its performance needs adjusted. Power through the ignitors 126, e.g. glow plugs, can be turned on if the device is not lit, or if stable self-sustaining combustion is occurring.

The methods and systems of the present disclosure, as described above and shown in the drawings, provide for fuel injectors with torch ignitors. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injector for a gas turbine engine, the fuel injector comprising:
a fuel nozzle configured to issue a spray of fuel from a fuel outlet in a downstream direction along an injection axis, the fuel nozzle defining a main flow passage therethrough;
an injection fuel line extending radially inward, relative to the injection axis, to an annular wall of the fuel nozzle and in fluid communication with the fuel nozzle to supply fuel to the fuel nozzle, wherein a centerline axis of the annular wall of the fuel nozzle is the injection axis; and
a torch ignitor including a combustion chamber, the torch ignitor configured to combust fuel to produce a flame, the torch ignitor further including a flame outlet opening into the main flow passage of the fuel nozzle for issuing the flame into the main flow passage, wherein the injection fuel line and the torch ignitor define a feed arm extending along a flame axis that is angled more than zero degrees and less than one-hundred-eighty degrees relative to the injection axis.

2. The fuel injector as recited in claim 1, wherein the flame outlet meets the main flow passage at a position that is upstream of the fuel outlet with respect to the downstream direction along the injection axis.

3. The fuel injector as recited in claim 1, wherein the main flow passage defines a main outlet for flame from the torch ignitor, wherein the fuel outlet is an annular opening.

4. The fuel injector as recited in claim 1, wherein the torch ignitor includes:
a torch wall defining the combustion chamber therein, wherein the combustion chamber is connected to issue flame through the flame outlet, the flame outlet extending through the torch wall and into the main flow passage of the fuel nozzle; and
a torch fuel injector mounted to the torch wall to issue fuel into the combustion chamber; and
at least one ignitor mounted to the torch wall, positioned to ignite fuel issued from the fuel injector.

5. The fuel injector as recited in claim 4, wherein the combustion chamber is connected to the flame outlet by a flame tube, wherein the flame tube and the flame outlet are oriented tangentially relative to the injection axis to swirl flame from the combustion chamber around the main flow passage of the fuel nozzle.

6. The fuel injector as recited in claim 1, wherein the fuel nozzle includes an inner air swirler of the main flow passage, the inner air swirler defining a plurality of passages configured to impart swirl on a flow of air flowing therethrough.

7. The fuel injector as recited in claim 6, wherein the plurality of passages of the inner air swirler are upstream of the flame outlet with respect to the downstream direction along the injection axis.

8. The fuel injector as recited in claim 6, wherein the fuel nozzle includes an inner heat shield outboard of the inner air swirler, with an insulation gap defined between the inner heat shield and the inner air swirler, wherein an intermediate air swirler is defined between the inner air swirler and the inner heat shield.

9. The fuel injector as recited in claim 8, wherein the fuel nozzle includes a fuel distributor outboard of the inner heat shield.

10. A fuel injector comprising:
a fuel nozzle configured to issue a spray of fuel from a fuel outlet in a downstream direction along an injection axis, the fuel nozzle defining a main flow passage therethrough;
an injection fuel line in fluid communication with the fuel nozzle to supply fuel to the fuel nozzle; and
a torch ignitor with a flame outlet opening into the main flow passage of the fuel nozzle for issuing flame into the main flow passage, wherein the fuel nozzle includes a fuel distributor and a prefilmer outboard of the fuel distributor, wherein the prefilmer includes a prefilming surface, wherein the fuel outlet is defined between the fuel distributor and the prefilming surface,
wherein the fuel nozzle includes an outer heat shield outboard of the prefilmer, with an insulation gap defined between the prefilmer and the outer heat shield, and
wherein the injection fuel line passes through the outer heat shield, the insulation gap, and the prefilmer into a fuel circuit defined between the fuel distributor and the prefilmer.

11. The fuel injector as recited in claim 10, wherein the outer heat shield defines an outer air passage outboard of the outer heat shield.

12. The fuel injector as recited in claim 11, wherein the torch ignitor passes through an inner heat shield and an inner air swirler.

13. A system comprising:
an engine case;
a combustor within the engine case; and
a plurality of fuel injectors extending from outside the engine case to the combustor to issue fuel and air into the combustor for combustion, wherein each of the fuel injectors in the plurality of fuel injectors includes:
a fuel nozzle connected to the combustor to issue a spray of fuel from a fuel outlet in a downstream direction along an injection axis, the fuel nozzle defining a main flow passage therethrough;
an injection fuel line extending radially inward, relative to the injection axis, to an annular wall of the fuel nozzle and in fluid communication with the fuel nozzle to supply fuel to the fuel nozzle, wherein a centerline axis of the annular wall of the fuel nozzle is the injection axis; and
a torch ignitor including a combustion chamber, the torch ignitor configured to combust fuel to produce a flame, the torch ignitor further including a flame outlet opening into the main flow passage of the fuel nozzle for issuing the flame into the main flow passage, wherein the injection fuel line and the torch ignitor define a feed arm extending along a flame axis that is angled relative to the injection axis.

* * * * *